US008092717B2

(12) United States Patent
Borade et al.

(10) Patent No.: US 8,092,717 B2
(45) Date of Patent: Jan. 10, 2012

(54) THERMOPLASTIC POLY(ARYLENE ETHER)/ POLYESTER BLENDS AND ARTICLES THEREOF

(75) Inventors: Pravin Borade, Maharashtra (IN); Donna Starrup Bossman, Onalaska, WI (US); Shreyas Chakravarti, Evansville, IN (US); Robert R Gallucci, Mt. Vernon, IN (US); Roshan Kumar Jha, Karnataka (IN); Ganesh Kannan, Evansville, IN (US); Nitin Moghe, Karanataka (IN); Przemyslaw Olszynski, Bergen Op Zoom (NL)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 11/776,890

(22) Filed: Jul. 12, 2007

(65) Prior Publication Data

US 2009/0014692 A1 Jan. 15, 2009

(51) Int. Cl.
*C08L 51/00* (2006.01)

(52) U.S. Cl. .......... 252/500; 525/65; 525/391; 525/396; 525/64; 252/511; 252/512

(58) Field of Classification Search .................. 252/500; 525/64, 65, 391, 396
See application file for complete search history.

(56) References Cited

U.S. PATENT DOCUMENTS 2,465,319 A 3/1949 Whinfield et al.
2,720,502 A 10/1955 Caldwell
2,727,881 A 12/1955 Caldwell et al.
2,822,348 A 2/1958 Haslam
3,047,539 A 7/1962 Pengilly
3,671,487 A 6/1972 Abolins
3,953,394 A 4/1976 Fox et al.
4,128,526 A 12/1978 Borman
4,565,684 A 1/1986 Tibbetts et al.
4,572,813 A 2/1986 Arakawa
4,663,230 A 5/1987 Tennent
4,664,972 A 5/1987 Connolly
4,816,289 A 3/1989 Komatsu et al.
4,876,078 A 10/1989 Arakawa et al.
5,024,818 A 6/1991 Tibbetts et al.
5,110,896 A 5/1992 Waggoner et al.
5,165,909 A 11/1992 Tennent et al.
5,288,786 A 2/1994 Nishio et al.
5,583,179 A 12/1996 Hwang et al.
5,589,152 A 12/1996 Tennent et al.
5,591,382 A 1/1997 Nahass et al.
5,698,632 A 12/1997 Brown et al.
5,719,236 A 2/1998 Brown et al.
2005/0228109 A1* 10/2005 Chandra et al. ............... 524/495
2006/0108567 A1* 5/2006 Charati et al. ................ 252/500
2007/0049690 A1 3/2007 Borade et al.
2007/0123625 A1* 5/2007 Dorade et al. ................ 524/423

FOREIGN PATENT DOCUMENTS

WO 2007027387 A1 8/2007

OTHER PUBLICATIONS

ISO 180, Plastics—Determination of Izod Impact Strength, 200-12-15, 16 pages.
ISO 527, Parts 1-5, Plastics—Determination of Tensile Properties, 56 pages.
Jana, et al., Compatibilization of PBT-PPE blends using low molecular weight epoxy, Polymer, 2001, 42, pp. 8681-8693.
Liu, et al., In Situ Compatibilization of PBT/PPO Blends, European Polymer Journal, 1996, 32, pp. 91-99.
International Search Report for International Application No. PCT/US2008/069786, mailed Jul. 16, 2010, 6 pages.
Written Opinion for International Application No. PCT/US2008/069786, mailed Jul. 16, 2010, 5 pages.

* cited by examiner

*Primary Examiner* — Mark Kopec
*Assistant Examiner* — Haidung Nguyen
(74) *Attorney, Agent, or Firm* — Cantor Colburn LLP

(57) ABSTRACT

Disclosed herein is a polymer composition comprising: a poly(arylene ether); a polyester; electrically conductive filler, and an impact modifier. The composition has a continuous phase comprising polyester and a disperse phase comprising poly(arylene ether). The amount of the disperse phase is less than 35 weight percent, based on the total weight of the composition.

33 Claims, 2 Drawing Sheets

FIG. 1
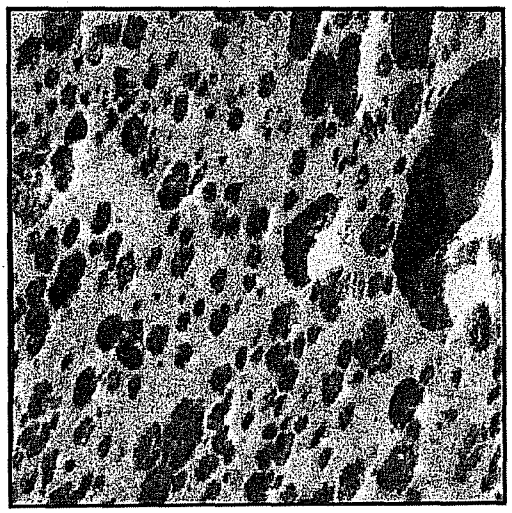
2 μm
FIG. 2
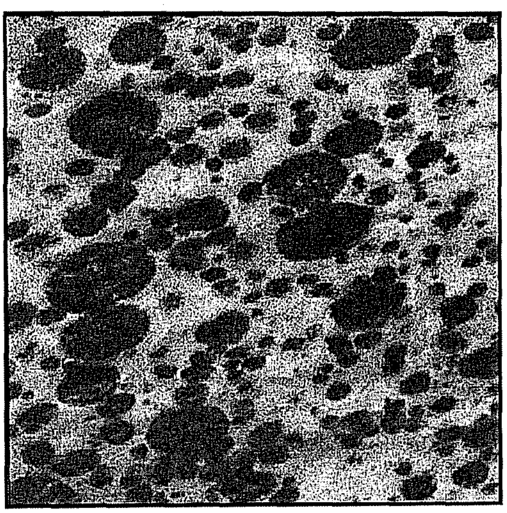
2 μm
FIG. 3
2 μm
FIG. 4
2 μm

FIG. 5
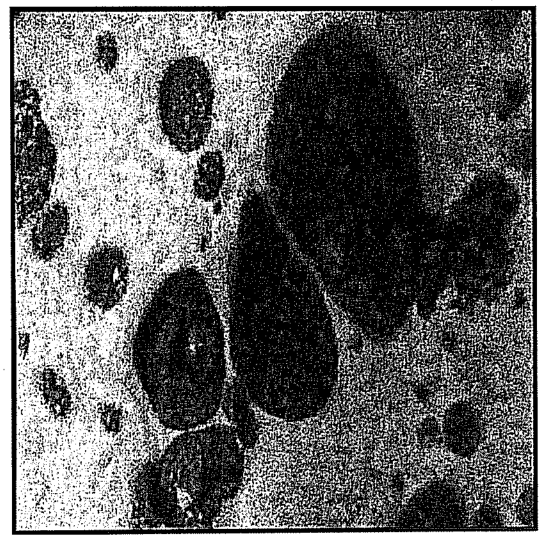
2 μm
FIG. 6
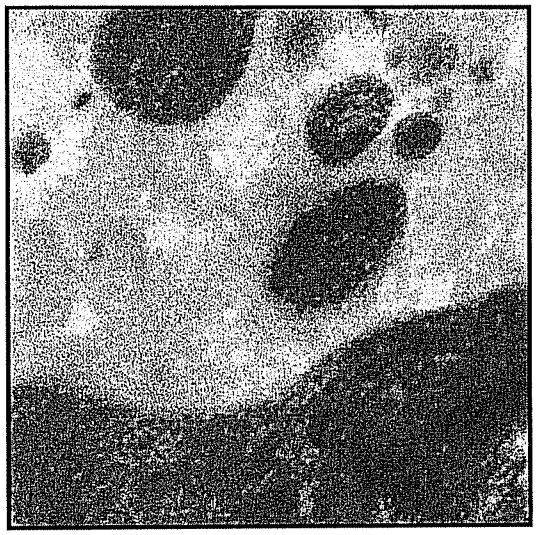
2 μm
FIG. 7
2 μm
FIG. 8
2 μm

THERMOPLASTIC POLY(ARYLENE ETHER) / POLYESTER BLENDS AND ARTICLES THEREOF

BACKGROUND OF THE INVENTION

Disclosed herein is a blend of poly(arylene ether) and thermoplastic polyester that exhibits enhanced properties, such as improved impact strength and nominal strain at break.

Poly(arylene ether)s are commercially attractive materials because of their unique combination of properties, including, for example, high temperature resistance, dimensional and hydrolytic stability, and electrical properties. Combinations of poly(arylene ether) with polyesters into compatibilized poly(arylene ether)/polyester blends are known. Compatibilized poly(arylene ether)-polyester blends seek to achieve a balance of properties needed for commercial applications, such as dimensional stability and impact strength. Unfortunately, known poly(arylene ether)/polyester blends do not provide a sufficient balance of properties to make them commercially attractive. It is therefore apparent that a need continues to exist for compatibilized poly(arylene ether)/polyester blends, which overcome some or all of the aforementioned difficulties.

BRIEF DESCRIPTION OF THE INVENTION

The needs discussed above have been addressed by a thermoplastic composition comprising:

a polyester;

a poly(arylene ether) wherein a portion of the poly(arylene ether) is functionalized poly(arylene ether); and an impact modifier;

wherein the composition comprises a continuous phase comprising polyester and a disperse phase comprising poly (arylene ether) and the amount of the disperse phase is less than 35 weight percent, based on the total weight of the composition. In the absence of electrically conductive filler the composition has a notched Izod value greater than or equal to 10 kilojoules per square meter as determined by ISO 180/1A and a nominal strain at break greater than or equal to 20% as determined by ISO 527. When the composition comprises electrically conductive filler the composition has a notched Izod value greater than or equal to 6 kilojoules per square meter as determined by ISO 180/1A and a nominal strain at break greater than or equal to 15% as determined by ISO 527.

Also described herein is a thermoplastic composition produced by melt blending:

a polyester;

a poly(arylene ether) wherein a portion of the poly(arylene ether) is functionalized poly(arylene ether);

an impact modifier; and a polymeric compatibilizer having an average of greater than or equal to 3 pendant epoxy groups per molecule;

wherein the composition comprises a continuous phase comprising polyester and a disperse phase comprising poly (arylene ether) and the amount of the disperse phase is less than 35 weight percent, based on the total weight of the composition. The composition, in the absence of electrically conductive filler, has a notched Izod greater than or equal to 10 kilojoules per square meter, as determined by ISO 180/1A and a nominal strain at break greater than or equal to 20% as determined by ISO 527. When the composition additionally comprises electrically conductive filler the composition has a notched Izod value greater than or equal to 6 kilojoules per square meter as determined by ISO 180/1A and a nominal strain at break greater than or equal to 15% as determined by ISO 527.

Also described herein is a thermoplastic composition produced by melt blending:

a polyester;

a poly(arylene ether);

an impact modifier;

a functionalizing agent; and a polymeric compatibilizer having an average of greater than or equal to 3 pendant epoxy groups per molecule, wherein the composition comprises a continuous phase comprising polyester and a disperse phase comprising poly (arylene ether) and the amount of the disperse phase is less than 35 weight percent, based on the total weight of the composition. The composition, in the absence of electrically conductive filler, has a notched Izod greater than or equal to 10 kilojoules per square meter, as determined by ISO 180/1A and a nominal strain at break greater than or equal to 20% as determined by ISO 527. When the composition additionally comprises electrically conductive filler the composition has a notched Izod value greater than or equal to 6 kilojoules per square meter as determined by ISO 180/1A and a nominal strain at break greater than or equal to 15% as determined by ISO 527.

Methods for preparing the compositions and articles comprising the compositions are also described.

BRIEF DESCRIPTION OF THE DRAWINGS

FIGS. 1 to 8 are transmission electron micrographs of Example 12 and Comparative Examples 7-9.

DETAILED DESCRIPTION OF THE INVENTION

Previously available poly(arylene ether)/polyester compositions have suffered from unstable phase morphology. In compositions having unstable phase morphology the distribution and size of the disperse phase particles change significantly when the composition is subjected to processing steps such as injection molding. During injection molding the composition is softened sufficiently to permit the composition to flow. Molding occurs under high shear and the combination of softening and high shear permits the disperse phase to exhibit coalescence in compositions with unstable phase morphology. Stated another way, disperse phase domains of compositions having unstable phase morphology coalesce under conditions of softening and high shear. This leads to molded parts with insufficient physical properties such as impact strength because the distribution and particle size of the disperse phase has a significant impact on the physical properties. This is particularly true in large injection molded parts because the composition usually experiences longer residences times in a softened state at high shear.

The composition described herein is a compatibilized poly (arylene ether)/polyester composition having stable phase morphology. The composition exhibits a unique combination of good heat resistance, dimensional stability, nominal strain at break and impact properties. Surprisingly it has been discovered that the amount of the disperse phase comprising poly(arylene ether) in relation to the amount of the total composition is critical to the formation of a stable morphology. The disperse phase comprising poly(arylene ether) is present in an amount that is less than or equal to 35 weight percent (wt %) based on the total weight of the composition. The impact modifier may reside in the disperse phase but may also be present at the interface between the phases. When the impact modifier resides in the disperse phase, the combined amount of impact modifier and poly(arylene ether) is less than 35 weight percent (wt %), based on the total weight of the composition. The exact amount and types or combinations of poly(arylene ether), impact modifier and polyester will depend, in part, on the requirements needed in the final blend composition. Most often, the poly(arylene ether) and impact modifier are present in an amount of 5 to 35 wt %, or, more specifically, 10 to 25 wt %, based on the total weight of the composition.

In one embodiment the thermoplastic composition is made using a three lobe extruder. In this embodiment the composition can comprise up to 45 wt % of a disperse phase comprising poly(arylene ether), based on the total weight of the composition. Despite having an increased amount of disperse phase the compositions meet or exceed the above mentioned criteria for notched Izod strength and nominal strain at break.

In addition to the amount of the disperse phase it is also important that the composition be made using a polymeric compatibilizer having an average of greater than or equal to 3 pendant epoxy groups per molecule. The quantity of pendant epoxy groups can be calculated as follows: the average number of pendant epoxy groups=(Number average molecular weight of the compatibilizer (g/mol)×epoxy content (meq/kg))/1,000,000.

Without being bound by theory it is believed that the stable morphology allows the composition to have a combination of excellent notched Izod strength and nominal break strain.

In compositions free of electrically conductive filler, the composition has a notched Izod greater than or equal to 10 kilojoules per square meter, or, more specifically, greater than or equal to 15 kilojoules per square meter. The notched Izod can be less than or equal to 120 kilojoules per square meter. In compositions comprising electrically conductive filler, the composition has a notched Izod greater than or equal to 6 kilojoules per square meter, or, more specifically, greater than or equal to 8 kilojoules per square meter. The notched Izod can be less than or equal to 50 kilojoules per square meter. As mentioned above, notched Izod is determined according to ISO 180/1A.

In compositions free of electrically conductive filler, the composition has a nominal strain at break greater than or equal to 20%, or, more specifically, greater than or equal to 25%. The nominal strain at break can be less than or equal to 100%. In compositions comprising electrically conductive filler, the composition has a nominal strain at break greater than or equal to 15%, or, more specifically, greater than or equal to 17%. The nominal strain at break can be less than or equal to 75%. As mentioned above, nominal strain at break is determined according to ISO 527.

In the specification and the claims, reference will be made to a number of terms, which shall be defined to have the following meanings. The singular forms "a", "an" and "the" include plural referents unless the context clearly dictates otherwise. "Optional" or "optionally" means that the subsequently described event or circumstance may or may not occur, and that the description includes instances where the event occurs and instances where it does not. Notched Izod values and nominal strain at break values described herein are determined at 23° C.

Poly(arylene ether) comprises repeating structural units of formula (I)

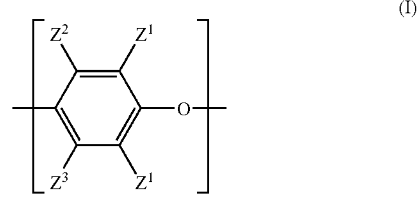

(I)

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as "substituted", it can contain heteroatoms over and above the carbon and hydrogen members of the substituent residue. Thus, when specifically described as substituted, the hydrocarbyl residue can also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it can contain heteroatoms within the backbone of the hydrocarbyl residue.

The poly(arylene ether) can comprise molecules having aminoalkyl-containing end group(s), typically located in an ortho position to the hydroxy group. Also frequently present are tetramethyl diphenylquinone (TMDQ) end groups, typically obtained from reaction mixtures in which tetramethyl diphenylquinone by-product is present.

The poly(arylene ether) can be in the form of a homopolymer; a copolymer; a graft copolymer; an ionomer; or a block copolymer; as well as combinations comprising two or more of the foregoing polymers. Poly(arylene ether) includes polyphenylene ether comprising 2,6-dimethyl-1,4-phenylene ether units optionally in combination with 2,3,6-trimethyl-1,4-phenylene ether units.

The poly(arylene ether) can be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

At least a portion of the poly(arylene ether) is functionalized with a polyfunctional compound (functionalizing agent) such as a polycarboxylic acid or those compounds having in the molecule both (a) a carbon-carbon double bond or a carbon-carbon triple bond and b) at least one carboxylic acid, anhydride, amino, imide, hydroxy group or salts thereof. Examples of such polyfunctional compounds include maleic acid, maleic anhydride, fumaric acid, and citric acid. The poly(arylene ether) can be functionalized prior to making the composition or can be functionalized as part of making the composition. Furthermore, prior to functionalization the poly (arylene ether) can be extruded, for example to be formed into pellets. It is also possible for the poly(arylene ether) to be melt mixed with other additives that do not interfere with functionalization. Exemplary additives of this type include flame retardants, flow promoters, and the like.

In some embodiments the poly(arylene ether) can comprise 0.1 wt % to 90 wt % of structural units derived from a functionalizing agent. Within this range, the poly(arylene ether) can comprise less than or equal to 80 wt %, or, more specifically, less than or equal to 70 wt % of structural units derived from functionalizing agent, based on the total weight of the poly(arylene ether).

The poly(arylene ether) can have a number average molecular weight of 3,000 to 40,000 grams per mole (g/mol) and a weight average molecular weight of 5,000 to 80,000 g/mol, as determined by gel permeation chromatography using monodisperse polystyrene standards, a styrene divinyl benzene gel at 40° C. and samples having a concentration of 1 milligram per milliliter of chloroform. The poly(arylene ether) or combination of poly(arylene ether)s has an initial intrinsic viscosity of 0.1 to 0.60 deciliters per gram (dl/g), as measured in chloroform at 25° C. Initial intrinsic viscosity is defined as the intrinsic viscosity of the poly(arylene ether) prior to melt mixing with the other components of the composition and final intrinsic viscosity is defined as the intrinsic viscosity of the poly(arylene ether) after melt mixing with the other components of the composition. As understood by one of ordinary skill in the art the viscosity of the poly(arylene ether) may be up to 30% higher after melt mixing. The percentage of increase can be calculated by (final intrinsic viscosity—initial intrinsic viscosity)/initial intrinsic viscosity. Determining an exact ratio, when two initial intrinsic viscosities are used, will depend somewhat on the exact intrinsic viscosities of the poly(arylene ether) used and the ultimate physical properties that are desired.

The poly(arylene ether) is present in an amount of 5 to 30 wt % based on the total weight of the entire composition. Within this range the poly(arylene ether) may be present in an amount greater than or equal to 10 wt %, or, more specifically, greater than or equal to 15 wt %.

Suitable polyesters include those comprising structural units of the formula (II):

$$-O-R^1-O-\overset{\displaystyle O}{\overset{\|}{C}}-A^1-\overset{\displaystyle O}{\overset{\|}{C}}- \qquad \text{(II)}$$

wherein each $R^1$ is independently a divalent aliphatic, alicyclic or aromatic hydrocarbon radical, or mixtures thereof and each $A^1$ is independently a divalent aliphatic, alicyclic or aromatic radical, or mixtures thereof. Examples of suitable polyesters comprising the structure of formula (II) are poly (allylene dicarboxylate)s, liquid crystalline polyesters, polyarylates, and polyester copolymers such as copolyestercarbonates and polyesteramides. Also included are polyesters that have been treated with relatively low levels of diepoxy or multi-epoxy compounds. It is also possible to use branched polyesters in which a branching agent, for example, a glycol having three or more hydroxyl groups or a trifunctional or multifunctional carboxylic acid has been incorporated. Treatment of the polyester with a trifunctional or multifunctional epoxy compound, for example, triglycidyl isocyanurate can also be used to make branched polyester. Furthermore, it is sometimes desirable to have various concentrations of acid and hydroxyl endgroups on the polyester, depending on the ultimate end-use of the composition.

In one embodiment at least some of the polyester comprises nucleophilic groups such as, for example, carboxylic acid groups. In some instances, it is desirable to reduce the number of carboxylic end groups, typically to less than 20 micro equivalents per gram of polyester, with the use of acid reactive species. In other instances, it is desirable that the polyester has a relatively high carboxylic end group concentration, in the range of 20 to 250 micro equivalents per gram of polyester or, more specifically, 30 to 100 micro equivalents per gram of polyester.

In one embodiment, the $R^1$ radical in formula (II) is a $C_{2-10}$ allylene radical, a $C_{6-10}$ alicyclic radical or a $C_{6-20}$ aromatic radical in which the alkylene groups contain 2-6 and most often 2 or 4 carbon atoms. The $A^1$ radical in formula (II) is most often p- or m-phenylene or a mixture thereof. This class of polyesters includes the poly(alkylene terephthalates), the poly(allylene naphthanates) and the polyarylates. Exemplary poly(allylene terephthalates) include linear aliphatic polyesters such as poly(ethylene terephthalate) (PET) and poly(butylene terephthalate) (PBT), as well as cyclic aliphatic polyesters such as poly(cyclohexanedimethanol terephthalate) (PCT). Exemplary poly(alkylene naphthalate)s include poly (butylene-2,6-naphthalate) (PBN) and poly(ethylene-2,6-naphthalate) (PEN). Other useful polyesters include poly (ethylene-co-cyclohexanedimethanol terephthalate) (PETG), polytrimethylene terephthalate (PTT), poly (dimethanol-1,4-cyclohexanedicarboxylate) (PCCD), and polyxylene terephthalate (PXT). Polyesters are known in the art as illustrated by the following U.S. Pat. Nos. 2,465,319, 2,720,502, 2,727,881, 2,822,348, 3,047,539, 3,671,487, 3,953,394, and 4,128,526.

Liquid crystalline polyesters having melting points less that 380° C. and comprising recurring units derived from aromatic diols, aliphatic or aromatic dicarboxylic acids, and aromatic hydroxy carboxylic acids are also useful. Examples of useful liquid crystalline polyesters include, but are not limited to, those described in U.S. Pat. Nos. 4,664,972 and 5,110,896. Mixtures of polyesters are also sometimes suitable.

The various polyesters can be distinguished by their corresponding glass transition temperatures (Tg) and melting points (Tm). The liquid crystalline polyesters generally have a Tg and Tm that are higher than the naphthalate-type polyesters. The naphthalate-type polyesters generally have a Tg and Tm that are higher than the terephthalate-type polyesters. Thus, the resultant poly(arylene ether) alloys with the liquid crystalline or naphthalate-type polyesters are typically better suited to applications requiring higher temperature resistance than are the terephthalate-type polyesters. The poly(arylene ether) alloys with terephthalate-type polyesters are generally easier to process due to the polyesters' lower Tgs and Tms. Selection of the polyester or blend of polyesters utilized is therefore determined, in part, by the desired property profile required by the ultimate end-use application for the composition.

Because of the tendency of polyesters to undergo hydrolytic degradation at the high extrusion and molding temperatures in some embodiments the polyester is substantially free of water. The polyester may be predried before admixing with the other ingredients. Alternatively, the polyester can be used without predrying and the volatile materials can be removed by vacuum venting the extruder. The polyesters generally have number average molecular weights in the range of 15,000-100,000, as determined by gel permeation chromatography (GPC) at 30° C. in a 60:40 by weight mixture of phenol and 1,1,2,2-tetrachloroethane.

The composition can comprise 40 to 90 wt % of the polyester, based on the total weight of the composition. Within this range the composition can comprise less than or equal to 80 wt %, or, more specifically, less than or equal to 75 wt %, or, even more specifically, less than or equal to 65 wt % polyester. Also within this range, the composition can comprise greater than or equal to 45 wt %, or, more specifically, greater than or equal to 50 wt % polyester.

The composition also comprises an impact modifier. In many embodiments the impact modifier resides primarily in the poly(arylene ether) phase. Examples of suitable impact modifiers include block copolymers; elastomers such as polybutadiene; random copolymers such as ethylene vinyl acetate (EVA); and combinations comprising two or more of the foregoing impact modifiers.

Exemplary block copolymers include A-B diblock copolymers and A-B-A triblock copolymers having one or two blocks A, which comprise structural units derived from an alkenyl aromatic monomer, for example styrene; and a rubber block, B, which generally comprises structural units derived from a diene such as isoprene or butadiene. The diene block may be partially hydrogenated. Mixtures of these diblock and triblock copolymers are especially useful.

Suitable A-B and A-B-A copolymers include, but are not limited to, polystyrene-polybutadiene; polystyrene-poly(ethylene-butylene); polystyrene-polyisoprene; polystyrene-poly(ethylene-propylene); poly(alpha-methylstyrene)-polybutadiene; poly(alpha-methylstyrene)-poly(ethylene-butylene); polystyrene-polybutadiene-polystyrene (SBS); polystyrene-poly(ethylene-butylene)-polystyrene (SEBS); polystyrene-polyisoprene-polystyrene; polystyrene-poly(ethylene-propylene)-polystyrene; poly(alpha-methylstyrene)-polybutadiene-poly(alpha-methylstyrene); as well as selectively hydrogenated versions thereof, and the like, as well as combinations comprising two or more of the foregoing impact modifiers. Such A-B and A-B-A block copolymers are available commercially from a number of sources, including Phillips Petroleum under the trademark SOLPRENE, Kraton Polymers, under the trademark KRATON, Dexco under the trademark VECTOR, and Kuraray under the trademark SEPTON When present, the amount of the impact modifier is 5 wt % to 22 wt %, based on the total weight of the composition. Within this range, the impact modifier may be present in amount greater than or equal to 8 wt %, or, more specifically, greater than or equal to 10 wt %. Also within this range, the impact modifier may be present in amount less than or equal to 20 wt %, or, more specifically, less than or equal to 18 wt %, or, even more specifically, less than or equal to 16 wt %. The exact amount and types or combinations of impact modifiers utilized will depend in part on the requirements needed in the final blend composition and may be determined by those skilled in the art.

In addition to the poly(arylene ether), polyester, and impact modifier, the composition is made using a polymeric compatibilizer having an average of greater than or equal to 3 pendant epoxy groups per molecule. In some embodiments the polymeric compatibilizer has an average of greater than or equal to 8 pendant epoxy groups per molecule, or, more specifically, an average of greater than or equal to 11 pendant epoxy groups per molecule or, more specifically, an average of greater than or equal to 15 pendant epoxy groups per molecule or, more specifically, an average of greater than or equal to 17 pendant epoxy groups per molecule. As used herein and throughout, a polymeric compatibilizer is a polymeric polyfunctional compound that interacts with the poly(arylene ether), the polyester, or both. This interaction may be chemical (e.g. grafting) and/or physical (e.g. affecting the surface characteristics of the disperse phases). When the interaction is chemical, the compatibilizer may be partially or completely reacted with the poly(arylene ether), polyester, or both such that the composition comprises a reaction product. For example, the epoxy groups may react with acid groups present on the polyester, the functional groups on the functionalized poly(arylene ether) or both during melt blending. Use of the polymeric compatibilizer can improve the compatibility between the poly(arylene ether) and the polyester, as may be evidenced by enhanced impact strength, mold knit line strength, elongation and/or the formation of a distinctive two phase morphology. Such morphology is evidenced by the occurrence of two distinct phases within a molded part; a continuous phase comprising polyester and a disperse phase comprising poly(arylene ether). The disperse phase particles have an average particle diameter of 0.2 to 5 micrometers, or, more specifically, 0.5 to 4 micrometers, or, even more specifically 0.5 to 3 micrometers. The average particle diameter is the average circular diameter of at least 100 particles and may be determined by scanning electron microscopy or by transmission electron microscopy. In the case of elliptical particles "circular diameter" is the mean of the major and minor axis of each particle. In other words, the diameters of the circumcircle and incircle are averaged for each elliptical particle.

Illustrative examples of suitable compatibilizers include, but are not limited to, copolymers of glycidyl methacrylate (GMA) with alkenes, copolymers of GMA with alkenes and acrylic esters, copolymers of GMA with alkenes and vinyl acetate, copolymers of GMA and styrene. Suitable alkenes comprise ethylene, propylene, and mixtures of two or more of the foregoing. Suitable acrylic esters comprise alkyl acrylate monomers, including, but not limited to, methyl acrylate, ethyl acrylate, propyl acrylate, butyl acrylate, and combinations of the foregoing alkyl acrylate monomers. When present, the acrylic ester may be used in an amount of 15 wt % to 35 wt % based on the total amount of monomer used in the copolymer. When present, vinyl acetate may be used in an amount of 4 wt % to 10 wt % based on the total amount of monomer used in the copolymer. Illustrative examples of suitable compatibilizers comprise ethylene-glycidyl acrylate copolymers, ethylene-glycidyl methacrylate copolymers, ethylene-glycidyl methacrylate-vinyl acetate copolymers, ethylene-glycidyl methacrylate-alkyl acrylate copolymers, ethylene-glycidyl methacrylate-methyl acrylate copolymers, ethylene-glycidyl methacrylate-ethyl acrylate copolymers, and ethylene-glycidyl methacrylate-butyl acrylate copolymers.

Use of glycidyl methacrylate copolymers as a polymeric compatibilizer is known in the art as illustrated by the following U.S. Pat. Nos. 5,698,632 and 5,719,236. However, unlike the prior art which teaches the compatibilizer can be compounds having two pendant epoxy groups per molecule as well as some mono-functional species, it has been discovered that the polymeric compatibilizer must have an average of greater than or equal to 3 pendant epoxy groups per molecule, or, more specifically, an average of greater than or equal to 8 pendant epoxy groups, or, more specifically, an average of greater than or equal to 11 pendant epoxy groups, or, more specifically, an average of greater than or equal to 15 pendant epoxy groups, or, more specifically, an average of greater than or equal to 17 pendant epoxy groups. Diglycidyl compounds do not exhibit the required reactivity to form a composition with a stable phase morphology.

The composition comprises 0.1 wt % to 20 wt % of polymeric compatibilizer, based on the total weight of the composition. Within this range, the composition can comprise less than or equal to 15 wt %, or, more specifically less than or equal to 10 wt %, or, even more specifically, less than or equal to 8 wt % compatibilizer. Also within this range, the composition may comprise greater than or equal to 0.5 wt %, or, more specifically, greater than or equal to 1 wt %, or, even more specifically, greater than or equal to 4 wt % compatibilizer.

The foregoing compatibilizer may be added directly to the composition or pre-reacted with either or both of the poly (arylene ether) and polyester, as well as with other materials employed in the preparation of the composition. The initial amount of the compatibilizer used and order of addition will depend upon the specific compatibilizer chosen and the specific amounts of poly(arylene ether) and polyester employed.

The composition may optionally comprise electrically conductive filler. The electrically conductive filler may be any filler that increases the electrical conductivity of the molded composition. Suitable electrically conductive fillers may be fibrous, disc-shaped, spherical or amorphous and include, for example, conductive carbon black; conductive carbon fibers, including milled fibers; conductive vapor-grown carbon fibers, and various mixtures thereof. Other electrically conductive fillers which can be used are metal-coated carbon fibers; metal fibers; metal disks; metal particles; metal-coated disc-shaped fillers such as metal-coated talcs, micas and kaolins; and the like. In some embodiments the electrically conductive fillers include carbon black, carbon fibers, and mixtures thereof, an illustrative example of which includes material available commercially from Akzo Chemical under the trademark Ketjen black EC600JD. In one embodiment, carbon black includes conductive carbon blacks having average particle sizes of less than 200 nanometers, or, more specifically, less than 100 nanometers, or, even more specifically, less than 50 nanometers. Conductive carbon blacks may also have surface areas greater than 200 square meters per gram ($m^2/g$), or, more specifically, greater than 400 $m^2/g$, or, even more specifically greater than 1000 $m^2/g$. Conductive carbon blacks may also have a pore volume (as measured by dibutyl phthalate absorption) of greater than 40 cubic centrimeters per 100 grams ($cm^3/100$ g), or, more specifically, greater than 100 $cm^3/100$ g, or, even more specifically, greater than 150 $cm^3/100$ g. Conductive carbon blacks may also have a volatiles content less than 2 weight percent. Useful carbon fibers include the graphitic or partially graphitic vapor-grown carbon fibers having diameters of 3.5 to 500 nanometers, or, more specifically, diameters of 3.5 to 70 nanometers, or, even more specifically, diameters of 3.5 to 50 nanometers. Representative carbon fibers are the vapor-grown carbon fibers, such as those available from Hyperion and single wall nanotubes such as those available from Carbon Nanotechnologies Incorporated (CNI). Conductive fillers of this type are described in, for example, U.S. Pat. Nos. 4,565,684 and 5,024,818 to Tibbetts et al.; U.S. Pat. No. 4,572,813 to Arakawa; U.S. Pat. Nos. 4,663,230 and 5,165,909 to Tennent; U.S. Pat. No. 4,816,289 to Komatsu et al.; U.S. Pat. No. 4,876,078 to Arakawa et al.; U.S. Pat. No. 5,589,152 to Tennent et al.; and U.S. Pat. No. 5,591,382 to Nahass et al.

Generally, the electrically conductive filler will be present in an amount of 0.2 weight percent to 20 weight percent based on the total weight of the composition. The amount will depend on the nature of the conductive filler. For example, when the conductive filler is conductive carbon black, the amount can be 1 to 10 wt %, or, more specifically, 1 to 8 wt %, or, even more specifically, 1.4 to 7 wt %. When the conductive filler is a vapor-grown carbon fiber, the amount can be 0.2 to 6 wt %, or, more specifically, 0.5 to 4 wt % based on the total weight of the composition. Conductive filler amounts less than the above lower limits often fail to provide adequate conductivity, while amounts greater than the above upper limits may tend to make the final blend brittle.

The composition may also comprise additives known in the art. Possible include anti-oxidants, dyes, pigments, colorants, stabilizers, flame retardants, drip retardants, crystallization nucleators, metal salts, antistatic agents, plasticizers, lubricants, and combinations comprising two or more of the foregoing additives. These additives are known in the art, as are their effective levels and methods of incorporation. Effective amounts of the additives vary widely, but they are usually present in an amount of less than or equal to 50 wt %, based on the total weight of the composition. Amounts of these additives are generally 0.25 wt % to 2 wt %, based upon the total weight of the composition. The effective amount can be determined by those skilled in the art without undue experimentation.

The composition may also comprise fillers as known in the art. Fillers may include reinforcing fillers. Exemplary fillers include small particle minerals (e.g., clay, mica, talc, and the like), glass fibers, nanoparticles, organoclay, and the like and combinations comprising one or more of the foregoing fillers. Fillers are typically used in amounts of 5 wt % to 50 wt %, based on the total weight of the composition.

The composition can be prepared using various techniques, including batch or continuous techniques that employ kneaders, extruders, mixers, and the like. For example, the composition can be formed as a melt blend employing a twin-screw extruder. In one embodiment at least some of the components are added sequentially. For example, the poly(arylene ether), the impact modifier, and functionalizing agent may be added to the extruder at the feed throat or in feeding sections adjacent to the feed throat, while the polyester and polymeric compatibilizer, may be added to the extruder in the subsequent feeding section downstream. A vacuum system may be applied to the extruder, prior to the second sequential addition, to generate a sufficient vacuum to lower the residual levels of non-reacted functionalizing agent and any other volatile materials. In an alternative embodiment, the sequential addition of the components may be accomplished through multiple extrusions. A composition may be made by preextrusion of selected components, such as the poly(arylene ether), the impact modifier and the functionalizing agent to produce a pelletized mixture. A second extrusion may then be employed to combine the preextruded components with the remaining components. The electrically conductive filler, when used, can be added as part of a masterbatch or directly. The masterbatch or the electrically conductive filler can be added either at the feedthroat or down stream. The extruder may be a two lobe or three lobe twin screw extruder. It is contemplated that a three lobe extruder may yield a composition with significantly higher notched Izod and nominal strain at break values when compared to compositionally identical compositions made using a two lobe twin screw extruder.

The thermoplastic composition may be used in a variety of articles such as sunshades, support elements, containers, covers, mailboxes, awnings, office furniture, partitions and the like. Compositions comprising electrically conductive filler can be powder coated.

Without further elaboration, it is believed that one skilled in the art can, using the description herein, make and utilize the composition to its fullest extent. The following examples are included to provide additional guidance to those skilled in the art in practicing the claimed composition. The examples provided are merely representative of the work that contributes to the teaching of the composition. Accordingly, these examples are not intended to limit the invention, as defined in the appended claims, in any manner.

EXAMPLES

Compositions described herein were typically extruded on a WP 25 millimeter (mm) co-rotating intermeshing twin-screw extruder. The components of the compositions and their source are listed in Table 1. Unless otherwise specified, the poly(arylene ether), antioxidants, functionalizing agent, and impact modifier were added at the feed throat of the extruder and the polyester and polymeric compatibilizer were added downstream, unless otherwise specified. The extruder was set with barrel temperatures of 150° C. to 300° C. The material was run at 15-20 kilograms per hour (kg/hr) with the screw rotating at 400 rotations per minute (rpm) with a vacuum of 100 millibar (mbar)-500 mbar applied to the melt during compounding. The torque was maintained at 60-65%. All examples were made using a two lobe extruder with the exception of the examples shown in Table 3 and Examples 20-23 in Table 8 which were made using a three lobe extruder. The three lobe extruder was a WP 28 millimeter co-rotating intermeshing twin-screw extruder. The three lobe extruder was set with barrel temperatures of 60° C. to 280° C. The material was run at 5-15 kg/hr with the screw rotating at 300 rpm and a vacuum of 100-500 mbar applied to the melt during compounding. The torque was maintained at 80-90%.

All samples were molded via injection molding with the molding machine set at 40-300° C. and mold set at 80° C., and tested for notched Izod impact strength (in units of kilojoules per square meter; kJ/$m^2$) according to ISO 180/1A. The tensile modulus (in units of gigaPascals; GPa) and % nominal strain at break (break strain %) were tested according to ISO 527. Heat resistance (Vicat B) was measured according to ISO 306 (in units of ° C.). Specific volume resistivity (SVR) was determined as follows. A tensile bar was molded according to ISO 3167. A sharp, shallow cut was made near each end of the narrow central portion of the bar. The bar was fractured in a brittle fashion at each cut to separate the narrow central portion, now having fractured ends with dimensions of 10×4 millimeters. If necessary to obtain fracturing in a brittle fashion, the tensile bar was first cooled, for example, in dry ice or liquid nitrogen in a minus 40° C. freezer. The length of the bar between the fractured ends was measured. The fractured ends of the sample were painted with conductive silver paint, and the paint was allowed to dry. Using a multi-meter in resistance mode, electrodes were attached to each of the painted surfaces, and the resistance was measured at an applied voltage of 500-1000 millivolts. Values of the specific volume resistivity were obtained by multiplying the measured resistance by the fracture area of one side of the bar and dividing by the length according to the equation $\rho=R\times A/L$ where $\rho$ is the specific volume resistivity in ohm-cm, R is the measured resistance in Ohms, A is the fractured area in $cm^2$, and L is the sample length in cm. The specific volume resistivity values thus have units of Ohm-cm and are presented as kilo Ohm-cm (k ohm cm). Domain particle size was analyzed by transmission electron microscopy (TEM) with a Philips CM12 TEM, operated at 120 kV. Micrographs of typical microstructures were taken at appropriate magnifications (4400× and 8800×). 100 nm sections required for TEM studies were prepared by ultramicrotomy at room temperature. These sections were collected on a standard 3 mm, 400 mesh Cu TEM grid. TEM sections used to study the disperse phase were vapor stained with freshly prepared $RuO_4$ solution for 30 seconds.

The component amounts of each of the compositions are shown in Tables 2-6, along with physical properties of molded test parts. The amount of each component is expressed in weight percent based on the total weight of the composition.

TABLE 1

| Component | Trade name and Supplier |
|---|---|
| PPE I | A poly(2,6-dimethyl-1,4-phenylene ether) having intrinsic viscosity of 0.41 dl/g available from GE Plastics. |
| PPE I-FA | Prepared by extruding 2% by weight fumaric acid with PPE I |
| PPE II | A copolymer of 2,6-dimethyl-1,4-phenylene ether and 2,3,6-trimethyl-1,4-phenylene ether having intrinsic viscosity of 0.39 dl/g available from GE Plastics. |
| PBT315 | A polybutylene terephthalate having an intrinsic viscosity of 1.2 dl/g as measured in 1:1 weight to weight mixture of phenol: 1,1,2,2-tetrachloro ethane at 30° C. available from GE Plastics |
| PBT195 | A polybutylene terephthalate having an intrinsic viscosity of 0.70 dl/g as measured in 1:1 weight to weight mixture of phenol: 1,1,2,2-tetrachloro ethane at 30° C. available from GE Plastics |
| IQPBT315 | A polybutylene terephthalate made from recycled PET having an intrinsic viscosity of 1.2 dl/g as measured in 1:1 weight to weight mixture of phenol: 1,1,2,2-tetrachloro ethane at 30° C. available from GE Plastics. |
| PET962 | A polyethylene terephthalate having an intrinsic viscosity of 0.80 dl/g as measured in 1:1 weight to weight mixture of phenol: 1,1,2,2-tetrachloro ethane at 30° C. available from Accordis |
| SEBS | Polystyrene-poly(ethylene-butylene)-polystyrene available as KRATON 1651 from KRATON Polymers. |
| SEP | Polystyrene-poly(ethylene-propylene) available as KRATON 1701 from KRATON Polymers. |
| BF E | A polymeric compatibilizer available as BONDFAST E from Sumitomo Chemicals and having an epoxy content around 900 meq/kg and a number average molecular weight (Mn) of 19,000. The compatibilizer has an average of 17 pendant epoxy groups per molecule (avg epoxy groups = 17) |

TABLE 1-continued

| Component | Trade name and Supplier |
|---|---|
| J 4368 | A polymeric compatibilizer available as Joncryl 4368 from Johnson Polymers having an epoxy content around 3500 meq/kg and an Mn of 6800. The compatibilizer has an average of 24 pendant epoxy groups per molecule (avg epoxy groups = 24). |
| J 4315 | A polymeric compatibilizer available as Joncryl 4315 from Johnson Polymers having an epoxy content around 190 meq/kg and an Mn of 2100. The compatibilizer has an average of 0.4 pendant epoxy groups per molecule (avg epoxy groups = 0.4). |
| J 4310 | A polymeric compatibilizer available as Joncryl 4310 from Johnson Polymers having an epoxy content around 414 meq/kg and an Mn of 2900. The compatibilizer has an average of 1.2 pendant epoxy groups per molecule (avg epoxy groups = 1.2). |
| DGHHP | Diglycidylhexahydrophthalate A available as SRHHPA from Sakamoto Yakuhin Kogyo having an epoxy content around 7000 meq/kg and an Mn of 284. The compatibilizer has an average of 2 pendant epoxy groups per molecule (avg epoxy groups = 2). |
| CCB | Conductive carbon black available as Ketjen black EC 600JD from Akzo Nobel |
| Functionalizing agent | Citric acid from SD Fine Chemicals Ltd |
| Stabilizer | IRGANOX 1010 & IRGAFOS 168/Ciba Specialty Chemicals |

Examples 1-8 and Comparative Examples 1-4

The compositions and physical properties of Examples 1-8 and Comparative Examples (CE) 1-4 are shown below in Table 2.

TABLE 2

| | Ex 1 | Ex 2 | CE 1 | CE. 2 | Ex 3 | Ex 4 | Ex 5 | Ex 6 | Ex 7 | Ex 8 | CE. 3* | CE 4 |
|---|---|---|---|---|---|---|---|---|---|---|---|---|
| PPE I | — | — | 29.4 | 17.5 | — | — | 17.9 | 17.9 | 17.9 | 17.9 | — | — |
| PPE I-FA | — | — | — | — | — | 18 | | | | | 32.4 | — |
| PPE II | 17.9 | 17.9 | — | 17.5 | 17.9 | — | | | | | — | 31.9 |
| SEBS | 7 | 7 | 8 | 10 | 7 | 11 | 14.0 | 8.0 | 14.0 | 8.0 | 5 | — |
| SEP | 7 | 7 | — | — | 7 | — | | | | | — | — |
| BF E | 6 | | 6 | 4 | 6 | 7.5 | 6.0 | 6.0 | | | 7.5 | 6 |
| Joncryl 4368 | | 1 | | | | | | | 1.0 | 1.0 | | |
| PBT 195 | | 64.6 | | | | | | | 66.0 | 72.0 | | |
| PBT315 | 59.6 | | 54.2 | 48.5 | 61 | 63.5 | 61.0 | 67.0 | | | 54.5 | 59.6 |
| CCB | 1.4 | 1.4 | 1.4 | 1.4 | — | — | — | — | — | — | — | — |
| Functionalizing agent | 0.7 | 0.7 | 0.4 | 0.7 | 0.7 | — | 0.7 | 0.7 | 0.7 | 0.7 | — | 0.7 |
| Stabilizer | 0.5 | 0.5 | 0.5 | 0.5 | 0.5 | — | 0.5 | 0.5 | 0.5 | 0.5 | 0.5 | 0.5 |
| Zn.St | — | — | — | — | — | — | | | | | 0.2 | — |
| Total disperse phase | 31.9 | 31.9 | 37.4 | 45 | 31.9 | 29 | 31.9 | 25.9 | 31.9 | 25.9 | 37.4 | 31.9 |
| Avg epoxy groups | 17 | 24 | 17 | 17 | 17 | 17 | 17 | 17 | 24 | 24 | 17 | 17 |
| Tensile Modulus (GPa) | 1.7 | 2.2 | 2 | 2 | 1.7 | 1.7 | 1.7 | 2.1 | 2.1 | 2.4 | 1.9 | 2.3 |
| Break strain (%) | 34 | 22.6 | 2.4 | 3.6 | 38 | 36 | 28.0 | 25.0 | 20.0 | 18.0 | 12 | 8.5 |
| Notched Impact (kJ/m$^2$) | 13 | 10.8 | 2.1 | 2 | 59 | 58 | 22.0 | 19.0 | 14.0 | 10.0 | 6 | 5 |
| Vicat B (° C.) | 145 | 165 | 176 | 175 | 145 | 149 | 148.5 | 162.0 | 157.0 | 171.0 | 180 | 188 |
| SVR (k ohm cm) | 4.2 | 143 | 0.1 | 0.8 | — | — | — | — | — | — | — | — |

*This comparative example correlates to Example 10 from U.S. Pat. No. 5,719,236

Examples 1-8 and Comparative Examples 1-4 show the importance of the quantity of the disperse phase in compositions containing an electrically conductive carbon black and in compositions not containing electrically conductive carbon black.

Examples 1 and 2 contain electrically conductive carbon black and have a disperse phase content less than 35 wt %. Comparative Examples 1 and 2 also contain electrically conductive carbon black but have a disperse phase content greater than 35 wt %. When the nominal strain at break (break strain) and notched Izod impact for Examples 1 and 2 are compared to the nominal strain at break (break strain) and notched Izod impact for Comparative Examples 1 and 2 there is a dramatic difference. The nominal strain at break of Examples 1 and 2 is approximately 10× the nominal strain at break of Comparative Examples 1 and 2. The notched Izod values for Examples 1 and 2 is approximately 5× the notched Izod of Comparative Examples 1 and 2.

Examples 3 to 8 when compared to Comparative Example 3 also show the importance of the quantity of disperse phase. Examples 3 to 8 have a nominal strain at break that is approximately 2× that of Comparative Example 3 and a notched Izod value that is approximately 3× to 10× that of Comparative Example 3. Comparative Example 4 shows the importance of including an impact modifier.

Examples 9-11 and Comparative Examples 5-6

Examples 9-11 and Comparative Examples 5 and 6 demonstrate the importance of the amount of the disperse phase when the composition is made using a 3 lobe twin screw extruder. Compositions and physical properties are shown in Table 3.

TABLE 3

| | Ex 9 | Ex 10 | Ex 11 | CE 5 | CE 6 |
|---|---|---|---|---|---|
| PPE I | 17.8 | 17.8 | 17.8 | 29.4 | 29.4 |
| SEBS | 14.0 | 14.0 | 14.0 | 20.0 | 14.0 |
| J 4368 | 1.0 | 1.0 | 1.4 | 1.4 | 1.4 |
| PBT195 | 65.0 | 64.8 | 65.0 | 47.2 | 53.0 |
| CCB | 1.4 | 1.6 | 1.4 | 1.4 | 1.4 |
| Functionalizing agent | 0.4 | 0.4 | 0.4 | 0.6 | 0.6 |
| Stabilizer | 0.5 | 0.5 | 0.5 | 0.5 | 0.5 |
| Total disperse phase | 31.8 | 31.8 | 31.8 | 49.4 | 43.4 |

TABLE 3-continued

| | Ex 9 | Ex 10 | Ex 11 | CE 5 | CE 6 |
|---|---|---|---|---|---|
| Avg epoxy groups | 24.0 | 24.0 | 24.0 | 24.0 | 24.0 |
| Tensile Modulus (GPa) | 2.0 | 2.0 | 2.0 | 1.8 | 2.1 |
| Break strain (%) | 30.0 | 30.0 | 26.0 | 3.3 | 6.5 |
| Notched Impact (kJ/m$^2$) | 12.0 | 12.0 | 13.4 | 5.4 | 6.4 |
| Vicat B (° C.) | 162 | 163 | 162 | 146 | 163 |
| SVR (k ohm cm) | 10.0 | 10.0 | 66.0 | 0.3 | 0.7 |

Examples 9-11 have notched Izod values that are approximately 2× the notched Izod values of Comparative Examples 5 and 6. Additionally, Examples 9-11 have nominal strain at break values that are more than 3× the nominal strain at break values of Comparative Examples 5-6.

Example 12 and Comparative Examples 7-9

Example 12 and Comparative Examples 7-9 show the importance of using a polymeric compatibilizer having an average of greater than or equal to 3 pendant epoxy groups per molecule. Compositions and physical properties are shown in Table 4.

TABLE 4

| | Ex. 12 | CE 7 | CE 8 | CE 9 |
|---|---|---|---|---|
| PPE I | 17.9 | 17.9 | 17.9 | 17.9 |
| SEBS | 7.0 | 7.0 | 7.0 | 7.0 |
| SEP | 7.0 | 7.0 | 7.0 | 7.0 |
| J 4368 | 1.0 | — | — | — |
| J 4310 | — | — | 8.5 | — |
| J 4315 | — | — | — | 18.0 |
| DGHHP | — | 0.5 | — | — |
| PBT195 | 64.6 | 65.1 | 57.1 | 47.6 |
| CCB | 1.4 | 1.4 | 1.4 | 1.4 |
| Total disperse phase | 31.9 | 31.9 | 31.9 | 31.9 |
| Avg epoxy groups | 24.0 | 2.0 | 1.2 | 0.4 |
| Epoxy equivalent added | 35.0 | 35.0 | 35.0 | 35.0 |
| Functionalizing agent | 0.7 | 0.7 | 0.7 | 0.7 |
| Stabilizer | 0.5 | 0.5 | 0.5 | 0.5 |
| Tensile Modulus (GPa) | 2.0 | 2.5 | 2.4 | 2.4 |
| Break strain (%) | 19.0 | 2.7 | 2.0 | 2.7 |
| Notched Impact (kJ/m$^2$) | 9.0 | 1.9 | 2.0 | 1.9 |
| Vicat B (° C.) | 165.0 | 156.0 | 138.0 | 120.0 |
| SVR (k ohm cm) | 2.8 | 0.7 | 0.5 | 1.3 |

Table 4 demonstrates the importance of a polymeric compatibilizer having an average of greater than or equal to 3 pendant epoxy groups per molecule. Both Example 12 and Comparative Examples 7-9 employ the same overall quantity of epoxy groups, thus ruling out an effect based on the total number of epoxy groups. Both Example 12 and Comparative Examples 7-9 have the same amount of disperse phase. Example 12 differs from Comparative Examples 7-9 primarily in the average number of epoxy groups per molecule in the polymeric compatibilizer. Example 12 has a nominal strain at break that is at least 8× the nominal strain at break of Comparative Examples 7-9. Example 12 also has a notched Izod value that is at least 4× the notched Izod of Comparative Examples 7-9.

Transmission electron micrographs of Example 12 and Comparative Examples 7-9 are shown in the figures. FIG. 1 is a micrograph of Example 12 after molding. The continuous light gray phase corresponds to the continuous phase comprising polyester and the dark gray phase corresponds to the dispersed phase comprising poly(arylene ether). The dispersed phase has an average particle diameter of 0.4 micrometers. FIG. 2 is a micrograph of Example 12 after molding and annealing of the molded sample for 8 minutes at 280° C. The micrograph shows the stability of dispersed phase on annealing indicating that the composition has a stable morphology. There was no statistically significant change in the average particle diameter of the disperse phase. FIG. 3 is a micrograph of Comparative Example 7 after molding. The sample has larger disperse phase particles when compared to Example 12. FIG. 4 is a micrograph of Comparative Example 7 after molding and annealing for 8 minutes at 280° C. The micrograph shows that there is coalescence of the disperse phase on annealing. Coalescence indicates that the morphology is not stable. FIG. 5 is a micrograph of Comparative Example 8 after molding. The sample also has larger disperse phase particles when compared to Example 12. FIG. 6 is a micrograph of Comparative Example 8 after molding and annealing for 8 minutes at 280° C. The micrograph shows that there is coalescence of the disperse phase on annealing. FIG. 7 is a micrograph of Comparative Example 9 after molding. The sample also has larger disperse phase particles when compared to Example 12. FIG. 8 is a micrograph of Comparative Example 9 after molding and annealing for 8 minutes at 280° C. The micrograph shows that there is coalescence of the disperse phase on annealing.

Examples 13-16

Examples 13-16 show the feasibility of using different polyesters. Compositions and physical properties are shown in Table 5.

TABLE 5

| | Ex. 13 | Ex. 14 | Ex. 15 | Ex. 16 |
|---|---|---|---|---|
| PPE I | — | — | — | 17.9 |
| PPE II | 17.9 | 17.9 | 17.9 | — |
| SEBS | 7.0 | 7.0 | 7.0 | 7.0 |
| SEP | 7.0 | 7.0 | 7.0 | 7.0 |
| BF E | 6.0 | 6.0 | 6.0 | 6.0 |
| J 4368 | — | — | — | — |
| PBT315 | 59.6 | 44.7 | 29.8 | — |
| IQPBT315 | — | — | — | 59.6 |
| PET962 | — | 14.9 | 29.8 | — |
| CCB | 1.4 | 1.4 | 1.4 | 1.4 |
| Functionalizing agent | 0.7 | 0.7 | 0.7 | 0.7 |
| Stabilizer | 0.5 | 0.5 | 0.5 | 0.5 |
| Total disperse phase | 31.9 | 31.9 | 31.9 | 31.9 |
| Avg epoxy groups | 17.0 | 17.0 | 17.0 | 17.0 |
| Tensile Modulus (GPa) | 1.7 | 1.7 | 1.7 | 1.6 |
| Break strain (%) | 34.0 | 28.7 | 26.7 | 18.8 |
| Notched Impact (kJ/m$^2$) | 13.0 | 10.2 | 11.5 | 8.3 |
| Vicat B (° C.) | 145.0 | 135.7 | 126.0 | 136.0 |
| SVR (k ohm cm) | 4.2 | 231.0 | 97.2 | 2.5 |

Table 5 demonstrates the invention is not limited to polybutylene terephthalate polyesters (PBT). Mixtures of polyethylene terephthalate (PET) and PBT were evaluated as well as the use of a polybutylene terephthalate made from recycled polyethylene terephthalate. The Examples were all able to meet the notched Izod and nominal strain at break criteria for compositions containing electrically conductive filler.

Examples 17 and Comparative Examples 10-11

Example 17 and Comparative Examples 10-11 show the importance of functionalizing the poly(arylene ether) and adding the polymeric compatibilizer after the poly(arylene ether) and functionalizing agent have reacted. Compositions and physical properties are shown in Table 6.

TABLE 6

| | Ex. 17 | CE. 10 | CE. 11 |
|---|---|---|---|
| PPE II | 17.9 | 17.9 | 17.9 |
| SEBS | 7.0 | 7.0 | 7.0 |
| SEP | 7.0 | 7.0 | 7.0 |
| BF E | 6.0 | 6.0 | 6.0 |
| PBT315 | 59.6 | 60.3 | 59.6 |
| CCB | 1.4 | 1.4 | 1.4 |
| Functionalizing agent | 0.7 | — | 0.7 |
| Stabilizer | 0.5 | 0.5 | 0.5 |
| Total disperse phase | 31.9 | 31.9 | 31.9 |
| Avg epoxy groups | 17.0 | 17.0 | 17.0 |
| Tensile Modulus (GPa) | 1.7 | 1.6 | 1.7 |
| Break strain (%) | 34.0 | 6.2 | 3.5 |
| Notched Impact (kJ/m$^2$) | 13.0 | 2.6 | 2.0 |
| Vicat B (° C.) | 145.0 | 139.0 | 148.0 |
| SVR (k ohm cm) | 4.2 | 167.0 | 0.5 |

Comparative Example 10 contain all the ingredients of Example 17 but lacks in the functionalizing agent and shows lower nominal strain at break and notched Izod values. Comparative Example 11 employs the same components as Example 17, differing in the order of addition of the BF E (polymeric compatibilizer). In Comparative Example 11, the compatibilizer was added to the feed throat compared to Example 17 whereby it was added downstream. Example 17 shows significantly higher nominal strain at break and notched Izod values compared to Comparative Example 11.

Examples 18-19

Examples 18 through 23 are a comparison of the effects of melt mixing on the poly(arylene ether). Examples 18, 20, and 22 were made with "new" poly(arylene ether), poly(arylene ether) that had been polymerized and used directly in the composition. Examples 19, 21 and 23 were made with poly (arylene ether) that was polymerized, extruded into pellets, and then used in the composition. Compositions and physical properties are shown in Table 7.

TABLE 7

| | Ex 18 | Ex 19 | Ex. 20 | Ex. 21 | Ex. 22 | Ex. 23 |
|---|---|---|---|---|---|---|
| PPE I | 17.9 | — | 17.9 | — | 17.9 | — |
| Extruded PPE I | — | 17.9 | — | 17.9 | — | 17.9 |
| SEBS | 7.0 | 7.0 | 14.0 | 14.0 | 14.0 | 14.0 |
| SEP | 7.0 | 7.0 | — | — | — | — |
| J 4368 | 1.0 | 1.0 | 1.0 | 1.0 | 1.0 | 1.0 |
| PBT195 | 64.6 | 64.6 | 66.3 | 66.3 | 64.6 | 64.6 |
| CCB | 1.4 | 1.4 | — | — | 1.6 | 1.6 |
| Functionalizing agent | 0.7 | 0.7 | 0.4 | 0.4 | 0.4 | 0.4 |
| Stabilizer | 0.5 | 0.5 | 0.5 | 0.5 | 0.5 | 0.5 |
| Total disperse phase | 31.9 | 31.9 | 31.9 | 31.9 | 31.9 | 31.9 |
| Avg epoxy groups | 24.0 | 24.0 | 24.0 | 24.0 | 24.0 | 24.0 |
| Tensile Modulus (GPa) | 2.0 | 2.1 | 2.0 | 2.0 | 2.0 | 2.0 |
| Break strain (%) | 19.0 | 18.0 | 33.6 | 33.6 | 31.32 | 18.76 |
| Notched Impact (kJ/m$^2$) | 9.0 | 7.0 | 15.8 | 12.4 | 12.7 | 9.5 |
| Vicat B (° C.) | 165.0 | 163.0 | 163.1 | 163.1 | 162.3 | 162.5 |
| SVR (k ohm cm) | 2.8 | 120.0 | — | — | 9 | 39 |

A comparison of Examples 18 and 19, Examples 20 and 21, and Examples 21 and 22 shows that using poly(arylene ether) that has already been melt mixed prior to the formation of the composition has little or no impact on the physical properties of the composition.

The terms "first," "second," and the like, "primary," "secondary," and the like, "(a)," "(b)" and the like, as used herein do not denote any order, quantity, or importance, but rather are used to distinguish one element from another. The endpoints of all ranges directed to the same component or property are inclusive of the endpoint and independently combinable. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All patents and published articles cited herein are incorporated herein by reference.

The invention claimed is:

1. A thermoplastic composition comprising:

a polyester;

a poly(arylene ether) wherein a portion of the poly(arylene ether) is functionalized poly(arylene ether);

electrically conductive filler and an impact modifier;

wherein the composition comprises a continuous phase comprising polyester and a disperse phase comprising poly(arylene ether) and impact modifier and the amount of the disperse phase is less than 35 weight percent, based on the total weight of the composition, wherein the composition has a notched Izod value greater than or equal to 6 kilojoules per square meter as determined by ISO 180/1A and a nominal strain at break greater than or equal to 15% as determined by ISO 527, and wherein the poly(arylene ether) is present in an amount of 5 to 30 weight percent, the polyester is present in an amount of 40 to 90 weight percent, the impact modifier is present in an amount of 5 to 22 weight percent, and the electrically conductive filler is present in an amount of 0.2 to 20 weight percent, wherein all weight percents are based on the total weight of the entire composition.

2. The composition of claim 1, wherein the combined amount of impact modifier and poly(arylene ether) is less than 35 weight percent, based on the total weight of the composition.

3. The composition of claim 1, wherein the composition has a notched Izod value greater than or equal to 8 kilojoules per square meter as determined by ISO 180/1A and a nominal strain at break greater than or equal to 17% as determined by ISO 527.

4. The composition of claim 1, wherein the disperse phase has an average particle diameter of 0.2 to 5 micrometers.

5. The composition of claim 1, wherein the poly(arylene ether) is melt mixed prior to forming the composition.

6. The composition of claim 1, wherein the polyester is a linear aliphatic polyester.

7. The composition of claim 1, wherein the impact modifier is a block copolymer or combination of block copolymers.

8. An article comprising the thermoplastic composition of claim 1.

9. A thermoplastic composition comprising:

40 to 90 weight percent of a linear aliphatic polyester;

5 to 30 weight percent of a poly(arylene ether) wherein a portion of the poly(arylene ether) is functionalized poly (arylene ether);

0.2 to 20 weight percent of an electrically conductive filler; and 5 to 22 weight percent of an impact modifier;

wherein the composition comprises a continuous phase comprising polyester and a disperse phase comprising poly(arylene ether) and impact modifier and the amount of the disperse phase is less than 35 weight percent, based on the total weight of the composition, wherein the composition has a notched Izod value greater than or equal to 6 kilojoules per square meter as determined by ISO 180/1A and a nominal strain at break greater than or equal to 15% as determined by ISO 527, and wherein weight percents are based on the total weight of the composition.

10. An article comprising the thermoplastic composition of claim 9.

11. A thermoplastic composition comprising:

40 to 90 weight percent, based on the total weight of the composition, of a polybutylene terephthalate;

5 to 30 weight percent, based on the total weight of the composition, of a poly(arylene ether) wherein a portion of the poly(arylene ether) is functionalized poly(arylene ether);

0.2 to 20 weight percent, based on the total weight of the composition, of an electrically conductive filler; and 5 to 22 weight percent, based on the total weight of the composition, of an impact modifier comprising a block copolymer or a combination of block copolymers;

wherein the composition comprises a continuous phase comprising polybutylene terephthalate and a disperse phase comprising poly(arylene ether) and impact modifier and the amount of the disperse phase is less than 35 weight percent, based on the total weight of the composition, and wherein the composition has a notched Izod value greater than or equal to 6 kilojoules per square meter as determined by ISO 180/1A and a nominal strain at break greater than or equal to 15% as determined by ISO 527.

12. A thermoplastic composition produced by melt blending:

a polyester;

a poly(arylene ether) wherein a portion of the poly(arylene ether) is functionalized poly(arylene ether);

an impact modifier;

an electrically conductive filler; and a polymeric compatibilizer having an average of greater than or equal to 3 pendant epoxy groups per molecule;

wherein the composition comprises a continuous phase comprising polyester and a disperse phase comprising poly(arylene ether) and impact modifier and the amount of the disperse phase is less than 35 weight percent, based on the total weight of the composition, wherein the composition has a notched Izod greater than or equal to 6 kilojoules per square meter, as determined by ISO 180/1A and a nominal strain at break greater than or equal to 15% as determined by ISO 527, and wherein the poly(arylene ether) is present in an amount of 5 to 30 weight percent, the polyester is present in an amount of 40 to 90 weight percent, the impact modifier is present in an amount of 5 to 22 weight percent, and the electrically conductive filler is present in an amount of 0.2 to 20 weight percent, wherein all weight percents are based on the total weight of the entire composition.

13. The composition of claim 12, wherein the combined amount of impact modifier and poly(arylene ether) is less than 35 weight percent (wt %), based on the total weight of the composition.

14. The composition of claim 12, wherein the composition has a notched Izod value greater than or equal to 8 kilojoules per square meter as determined by ISO 180/1A and a nominal strain at break greater than or equal to 17% as determined by ISO 527.

15. The composition of claim 12, wherein the polymeric compatibilizer has an average of greater than or equal to 8 pendant epoxy groups per molecule.

16. The composition of claim 15, wherein the polymeric compatibilizer has an average of greater than or equal to 11 pendant epoxy groups per molecule.

17. The composition of claim 16, wherein the polymeric compatibilizer has an average of greater than or equal to 15 pendant epoxy groups per molecule.

18. The composition of claim 17, wherein the polymeric compatibilizer has an average of greater than or equal to 17 pendant epoxy groups per molecule.

19. The composition of claim 12, wherein the polyester is a linear aliphatic polyester.

20. The composition of claim 12, wherein the impact modifier is a block copolymer or combination of block copolymers.

21. An article comprising the thermoplastic composition of claim 12.

22. A thermoplastic composition produced by melt blending:

a polyester;

a poly(arylene ether);

an impact modifier;

a functionalizing agent;

an electrically conductive filler; and a polymeric compatibilizer having an average of greater than or equal to 3 pendant epoxy groups per molecule, wherein the composition has a notched Izod greater than or equal to 6 kilojoules per square meter, as determined by ISO 180/1A and a nominal strain at break greater than or equal to 15% as determined by ISO 527, and wherein the poly(arylene ether) is present in an amount of 5 to 30 weight percent, the polyester is present in an amount of 40 to 90 weight percent, the impact modifier is present in an amount of 5 to 22 weight percent, and the electrically conductive filler is present in an amount of 0.2 to 20 weight percent, wherein all weight percents are based on the total weight of the entire composition, and wherein the composition comprises a continuous phase comprising polyester and a disperse phase comprising poly(arylene ether) and impact modifier and the amount of the disperse phase is less than 35 weight percent, based on the total weight of the composition.

23. The composition of claim 22, wherein the composition has a notched Izod value greater than or equal to 8 kilojoules per square meter as determined by ISO 180/1A and a nominal strain at break greater than or equal to 17% as determined by ISO 527.

24. The composition of claim 22, wherein the polymeric compatibilizer has an average of greater than or equal to 8 pendant epoxy groups per molecule.

25. The composition of claim 24, wherein the polymeric compatibilizer has an average of greater than or equal to 11 pendant epoxy groups per molecule.

26. The composition of claim 25, wherein the polymeric compatibilizer has an average of greater than or equal to 15 pendant epoxy groups per molecule.

27. The composition of claim 26, wherein the polymeric compatibilizer has an average of greater than or equal to 17 pendant epoxy groups per molecule.

28. The composition of claim 22, wherein the polyester is a linear aliphatic polyester.

29. The composition of claim 22, wherein the impact modifier is a block copolymer or combination of block copolymers.

30. An article comprising the thermoplastic composition of claim 22.

31. A thermoplastic composition produced by melt blending:

40 to 90 weight percent, based on the total weight of the composition, of a polybutylene terephthalate;

5 to 30 weight percent, based on the total weight of the composition, of a poly(arylene ether) wherein a portion of the poly(arylene ether) is functionalized poly(arylene ether);

5 to 22 weight percent, based on the total weight of the composition, of an impact modifier;

0.2 to 20 weight percent, based on the total weight of the composition, of an electrically conductive filler; and 0.1 to 20 weight percent, based on the total weight of the composition, of a polymeric compatibilizer having an average of greater than or equal to 3 pendant epoxy groups per molecule;

wherein the composition comprises a continuous phase comprising polyester and a disperse phase comprising poly(arylene ether) and impact modifier and the amount of the disperse phase is less than 35 weight percent, based on the total weight of the composition, wherein the composition has a notched Izod greater than or equal to 6 kilojoules per square meter, as determined by ISO 180/1A and a nominal strain at break greater than or equal to 15% as determined by ISO 527.

32. A thermoplastic composition produced by melt blending:

40 to 90 weight percent, based on the total weight of the composition, of a polybutylene terephthalate 5 to 30 weight percent, based on the total weight of the composition, of a poly(arylene ether);

5 to 22 weight percent, based on the total weight of the composition, of an impact modifier;

a functionalizing agent;

0.2 to 20 weight percent, based on the total weight of the composition, of an electrically conductive filler; and 0.1 to 20 weight percent, based on the total weight of the composition, of a polymeric compatibilizer having an average of greater than or equal to 3 pendant epoxy groups per molecule wherein the composition comprises a continuous phase comprising polybutylene terephthalate and a disperse phase comprising poly (arylene ether) and impact modifier and the amount of the disperse phase is less than 35 weight percent, based on the total weight of the composition, and, wherein the composition has a notched Izod greater than or equal to 6 kilojoules per square meter, as determined by ISO 180/1A and a nominal strain at break greater than or equal to 15% as determined by ISO 527.

33. An article comprising a thermoplastic composition, wherein the thermoplastic composition comprises:

40 to 90 weight percent, based on the total weight of the composition, of a polybutylene terephthalate;

5 to 30 weight percent, based on the total weight of the composition, of a poly(arylene ether) wherein a portion of the poly(arylene ether) is functionalized poly(arylene ether);

0.2 to 20 weight percent, based on the total weight of the composition, of an electrically conductive filler; and 5 to 22 weight percent, based on the total weight of the composition, of an impact modifier comprising a block copolymer or a combination of block copolymers;

wherein the composition comprises a continuous phase comprising polybutylene terephthalate and a disperse phase comprising poly(arylene ether) and impact modifier and the amount of the disperse phase is less than 35 weight percent, based on the total weight of the composition, and wherein the composition has a notched Izod value greater than or equal to 6 kilojoules per square meter as determined by ISO 180/1A and a nominal strain at break greater than or equal to 15% as determined by ISO 527.

* * * * *